United States Patent
Mai et al.

(10) Patent No.: US 11,484,814 B2
(45) Date of Patent: Nov. 1, 2022

(54) PUMP SEPARATING GAS FROM LIQUID

(71) Applicant: VIETTEL GROUP, Ha Noi (VN)

(72) Inventors: Xuan Hai Mai, Ha Noi (VN); Hong Phu Pham, Ha Noi (VN); Trong Dai Vu, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 255 days.

(21) Appl. No.: 16/860,293

(22) Filed: Apr. 28, 2020

(65) Prior Publication Data

US 2020/0368641 A1 Nov. 26, 2020

(30) Foreign Application Priority Data

May 22, 2019 (VN) .............................. 1-2019-02650

(51) Int. Cl.
*B01D 19/00* (2006.01)
*F04D 13/02* (2006.01)

(52) U.S. Cl.
CPC ......... *B01D 19/0063* (2013.01); *F04D 13/02* (2013.01)

(58) Field of Classification Search
None
See application file for complete search history.

(56) References Cited

U.S. PATENT DOCUMENTS

| | | | |
|---|---|---|---|
| 4,256,435 A * | 3/1981 | Eckel | F03D 1/0658 415/908 |
| 4,776,758 A * | 10/1988 | Gullichsen | F04D 7/04 96/174 |
| 4,799,940 A * | 1/1989 | Millikan | B01D 19/0063 96/214 |
| 4,981,413 A | 1/1991 | Elonen et al. | |
| 5,129,796 A * | 7/1992 | Emmert | F04D 29/606 417/423.5 |
| 5,693,125 A * | 12/1997 | Dean | B01D 45/14 55/318 |

FOREIGN PATENT DOCUMENTS

EP 0298442 A2 1/1989

* cited by examiner

*Primary Examiner* — Christopher P Jones
*Assistant Examiner* — Phillip Y Shao
(74) *Attorney, Agent, or Firm* — Patenttm.US

(57) ABSTRACT

A centrifugal pump separating gases from liquids pumps fluid containing gas comprises a pump housing divided into a working fluid chamber and an empty chamber by a baffle, the empty chamber connected to the working fluid chamber by an opening and connected to a gas separation assembly by a pumping chamber duct; an inlet for drawing liquid into pump, a outlet for pumping liquid outward and a separated gas exhaust port; an electric motor with protective cover drives an impeller cluster to create rotary movement; gas separator has a spring of sufficient hardness to control the gas discharge valve to open and close; this gas separator is connected to the empty chamber by the duct mentioned above and connected to the pump outlet by the bleed hole. During operation, when suction gas reaches a certain amount, reduced pressure at the pump outlet opens the valve to release the gas.

9 Claims, 5 Drawing Sheets

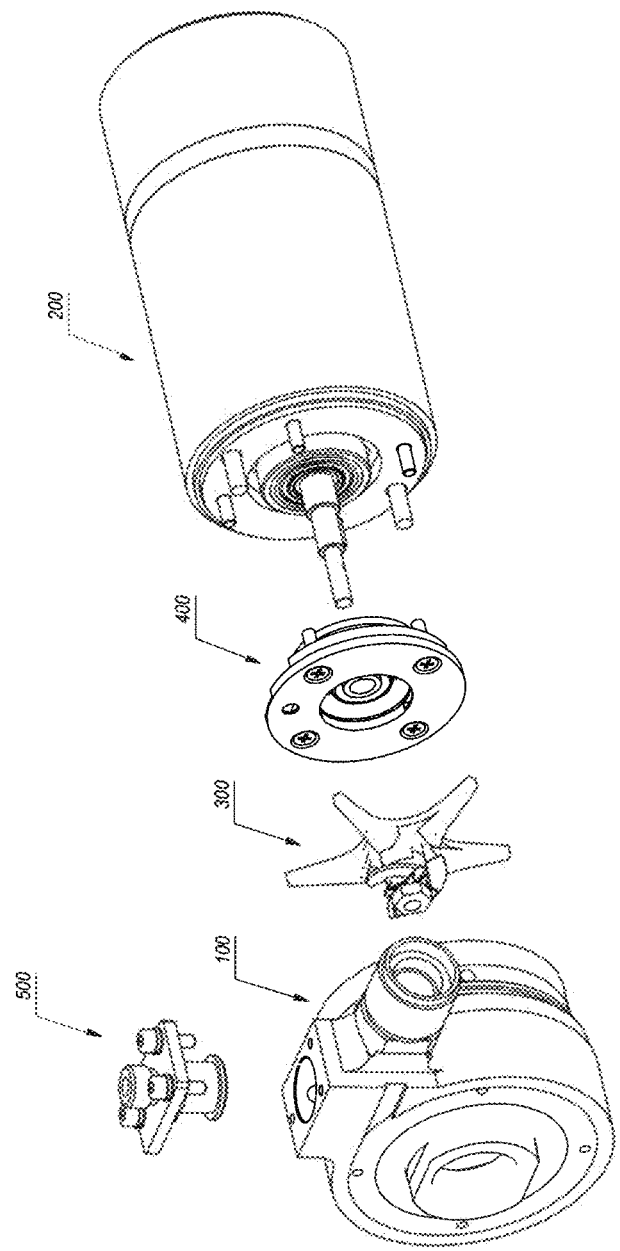
Figure 1-a

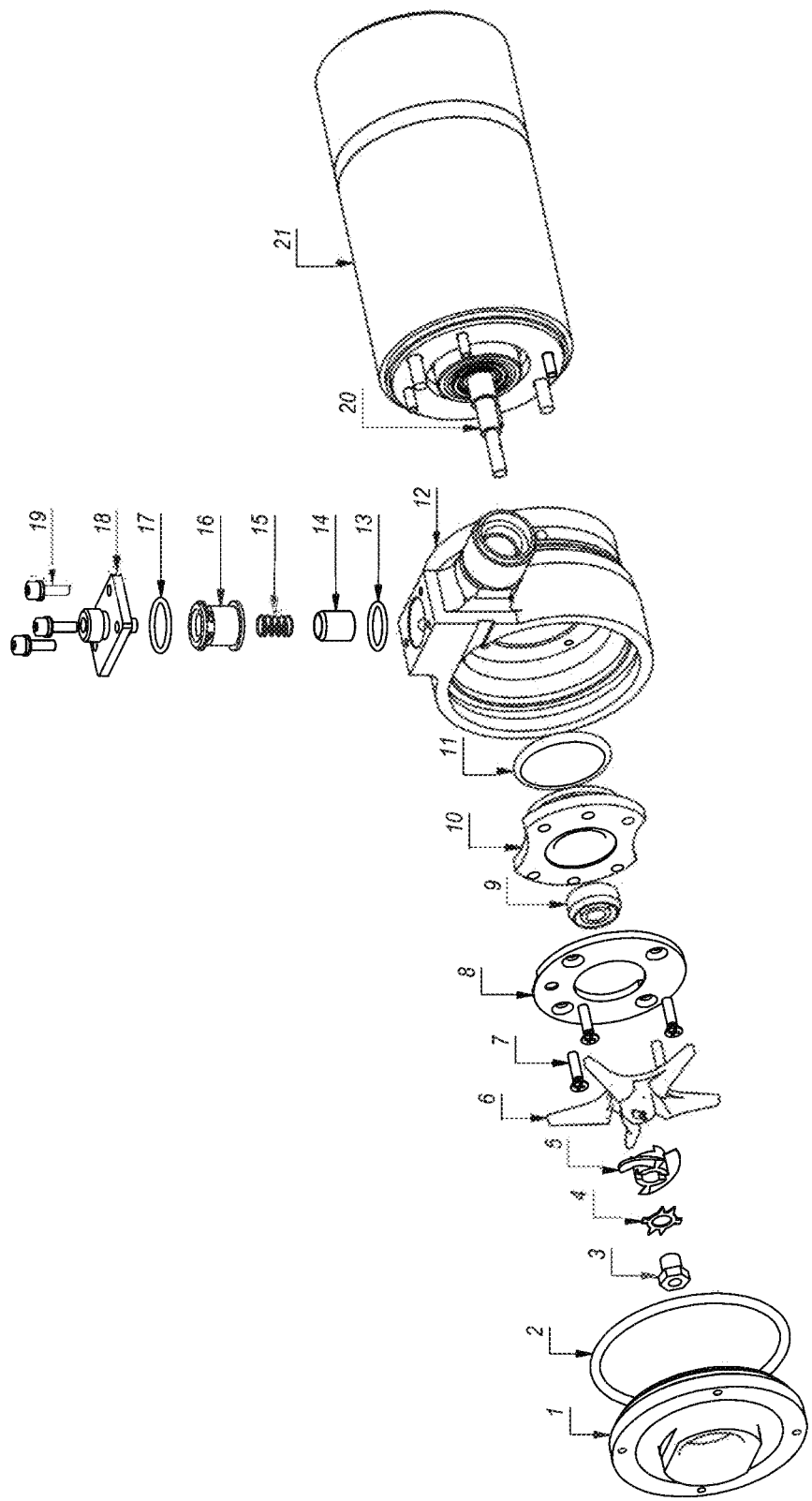
Figure 1-b

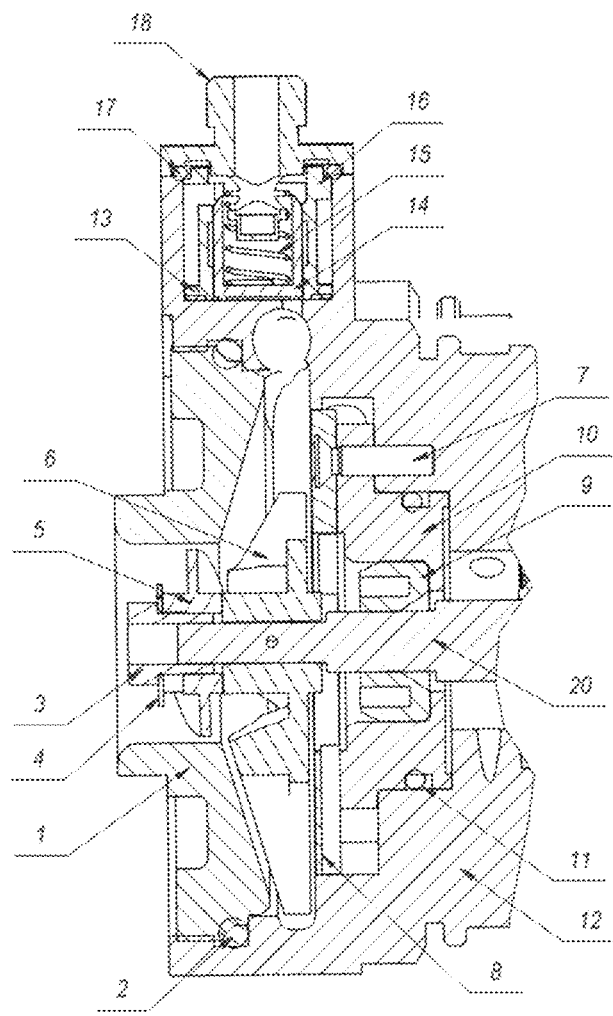
Figure 2-a
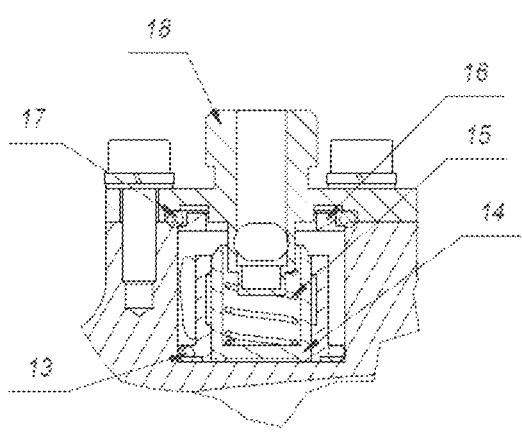
Figure 2-b
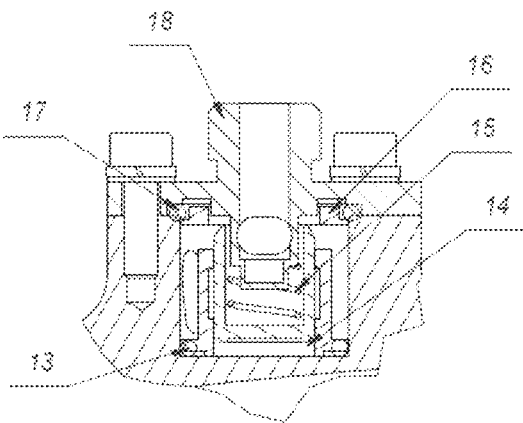
Figure 2-c

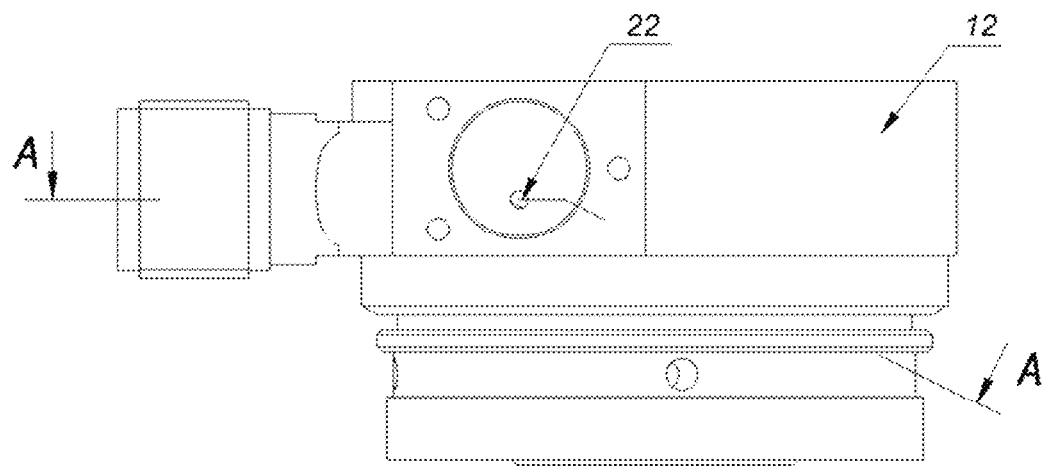
Figure 3-a
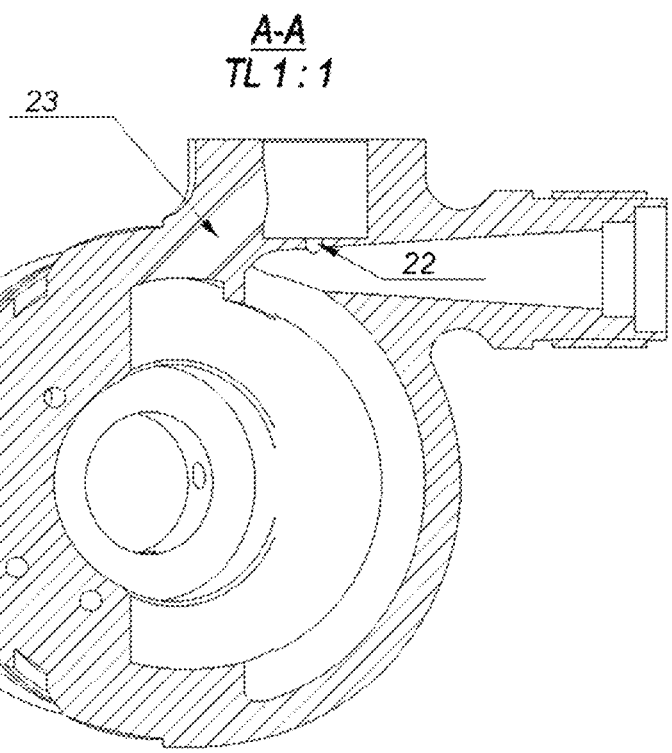
Figure 3-b

PUMP SEPARATING GAS FROM LIQUID

FIELD OF THE INVENTION

The present invention is directed to a pump separating gas from liquids. More specifically, the invention relates to a gas separation mechanism of a centrifugal pump used for pumping of a fluid containing gas. Patented pumps are particularly suitable for use in engine fuel pumps or other types of pumps requiring removal of gas from liquids.

BACKGROUND DESCRIPTION

As known, the pumping of a liquid containing a high content of gas will be risky without a gas discharge system because the gas concentrates around the center of the pump impeller, forming bubbles, thus tends to clog the entire inlet opening of the pump. This results in poor performance, increased equipment vibration, and in the worst case, a complete stopping of the pump. In particular, for the fuel pump for engines, the presence of gas in the fuel supply line can cause the engine to lose efficiency, even causing the engine to stop suddenly.

Currently, there are different ways to separate gas from a liquid containing gas. In mechanisms currently known and used, gas separation is performed by drawing gas through a pipe being disposed in the middle of the inlet opening of the pump and extending to the hub of the impeller, by drawing gas through a hollow shaft of the impeller, or by providing the impeller with one or more perforations through which the gas is drawn to the back side of the impeller and away. However, problems arise when the liquid contains foreign matter such as thread, fiber suspensions and the like. This tends to clog the gas discharge duct of the pump. At the same time, this mechanism does not seem effective when the liquid can follow the gas discharge pipe back to the tank.

In the world, there are a few inventions that allow the separation of gases from liquids, but each has its advantages and disadvantages. Specifically:

U.S. Pat. No. 4,981,413A: This invention proposes a pulp pump and method of separating gas from liquid by using the combination of the centrifugal pump impeller with the vacuum pump impeller so that the vacuum impeller is arranged on the back side of the centrifugal impeller without the necessity of a separating wall. Gas is separated from the liquid through the gas discharge opening of the impeller and outward. However, this method will require large pump sizes, complexity in the impeller design, in addition to lower efficiency due to the need to provide part of the energy for the vacuum pump. Therefore, this invention will be suitable for applications in industry where the fixed system is not limited in size.

European patent number EP0298442A2: the invention also proposes a pump and a method for separating gas from liquids using a centrifugal pump. While the fluid is being pumped, the flow of both the separating gas and other material being carried with it is led to the separation process where solids are separated from said flow, whereby it will be possible to separately discharge the gas. However, this method is only suitable for use in the pulp industry where the liquid contains gas and suspension fibers.

To overcome these limitations, the invention proposes a pump design that uses a gas separation mechanism based on the change in fluid pressure when the suction pump contains gas to remove gas through a spring shut-off valve

TECHNICAL BACKGROUND OF THE INVENTION

The purpose of the present invention is to propose a new design to simplify the gas separation mechanism of the centrifugal pump. A characteristic feature of the pump according to the present invention is a combination of a gas separation mechanism that uses spring shut-off valve when there is a change in liquid pressure when the suction pump contains gas. And the way of fluid flow by combining the use of axial impeller in front of centrifugal impeller increases pump efficiency as well as reduces the size of gas.

To achieve the above-mentioned purpose, the invention proposes a pump to separate gas from liquid including: Impeller cluster consists of axial and centrifugal impellers driven by a DC motor. The motor is protected by metal cover. The impeller is located at the pump housing which containing the working liquid, this part of the liquid is prevented from flowing outward by sealing the shaft of the motor. The special feature of the gas separation mechanism is the gas separator consisting of a discharge valve that is opened or closed based on the pressure difference between the spaces inside the pump.

BRIEF DESCRIPTION OF THE DRAWINGS

FIG. 1-a: Perspective drawing of components showing centrifugal pump according to the invention;

FIG. 1-b: Perspective drawing of separate parts showing centrifugal pump according to the invention;

FIG. 2-a: Cross-sectional drawing showing the location of assembly of pump components according to the invention;

FIG. 2-b: Cross-sectional drawing showing the open state of a valve;

FIG. 2-c: Cross-sectional drawing showing the closed state of a valve;

FIG. 3-a: Drawing showing pump chamber from the gas separator view;

FIG. 3-b: A-A cross-section drawing of the pump housing showing the position of the duct between the pump chamber and the gas separator, the gap between the gas separator and the pump outlet;

DETAILED DESCRIPTION OF THE INVENTION

Figure 4:
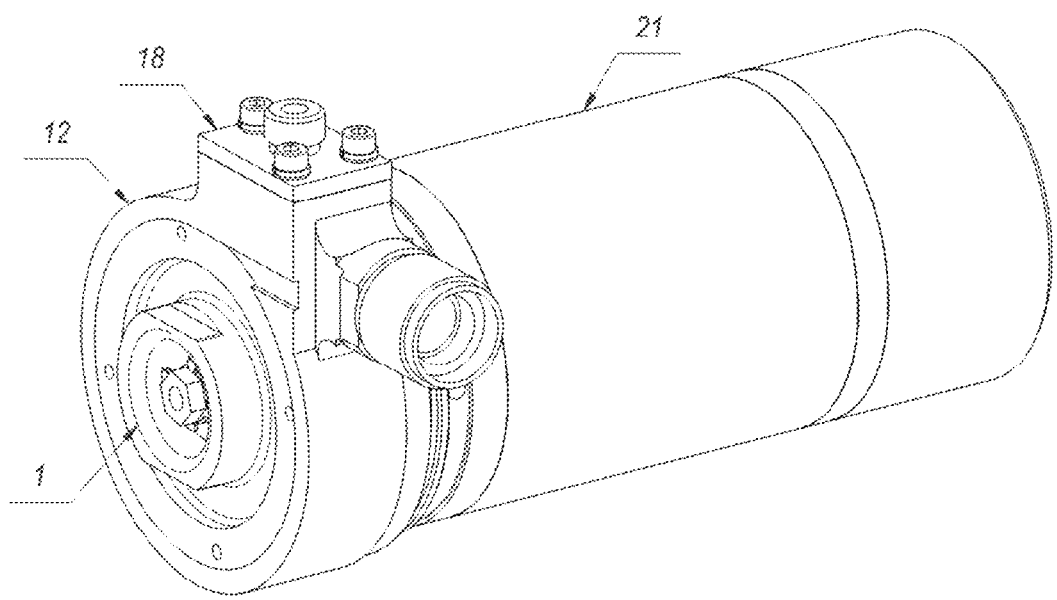
FIG. 4: Perspective drawing of the pump according to the invention in complete assembly state.

Refer to FIG. 1-a, the structure of the pump separates gas from liquid or centrifugal pump according to the design including the basic components: Pump housing 100; Motor and driven mechanism 200; Impeller cluster 300; Seal assembly 400; Gas separator 500.

FIG. 1-b shows the separate parts as below:

Pump housing 100 is made up of cover plate 1 and frame structure 12 into a space containing the working fluid for circulating fluid flow from the pump inlet of the cover plate 1 to the pump outlet of the frame structure 12. The two parts are sealed by O-ring 2 to prevent liquid from leaking back out.

Motor and driven mechanism 200 are electric motors 21 that provide the mechanical power through the drive shaft 20, the electric motor 21 is fixed on the frame structure 12 so that the drive shaft 20 must reach a certain concentricity with the inner circumference of the pump chamber, the purpose of this is to satisfy the assembly requirements of the seal assembly. This motor can be replaced by engines similar to internal combustion engines and pneumatic engines but must ensure the necessary power and revolutions.

The impeller cluster includes 300 axial impeller shaped like two or more spiral blade and centrifugal impeller 6 that has many vane shapes extending from the center to the outside. These two impellers are mounted in succession on the drive shaft 20 in FIG. 2-a, the axial impeller 5 is located just behind the pump inlet (cover plate 1) which draws the fluid flow into the pump housing and shrinks large gas concentrated at the pump inlet, both impellers are fixed on the drive shaft 20 based on bolts 3 and anti-turn 4. Impeller material must ensure the request of mechanical strength, chemical corrosion resistance and cavitation erosion resistance such as copper, aluminum or stainless steel alloys.

Seal assembly 400 includes oil seal 9, oil seal plate 10 and O-ring 11, seal assembly is fixed to frame structure 12 by baffle 8 and bolts 7. When the pump operates in the environment such as: chemicals, high temperature pressure, large rotation speed, it is necessary to select the type of oil seal 9 according to the standard of the shape and material of the seal, normally this seal is made from rubber or synthetic polymers. Baffle 8 has a special design that not only fixes the seal assembly, but also divides the pump housing into the empty chamber and the working fluid chamber. On baffle 8, there is an opening for allowing the passing of working fluid and gas into the empty chamber, the position of the opening is located between the center and the outside of the pump chamber in the opposite direction to gravity.

Gas separator 500 is a gas discharge valve consisting of valve seat 14, spring 15 and valve body 16. All parts are sealed by O-ring 13 and 17 and fixed to frame structure 12 by the gas separator cap 18 and bolts 19. This gas separator is connected to the pump outlet by the bleed hole 22 and connected to the empty chamber by the gas discharge vent 23 as referenced in FIG. 3-a and FIG. 3-b. This valve operates in two states of opening and closing. In the open state, the spring 15 is compressed due to the valve seat 14 moving along valve body 16 into the open position as FIG. 2-b then creates a flow from the empty chamber to the gas exhaust port on the gas separator cap 18. This valve closes when there is a force applied on valve seat 14 so that the spring is further compressed until this force is large enough to push valve seat 14 into the closed position as FIG. 2-c.

FIG. 2-a shows the position of correlation between parts when the pump is fully assembled and ready to operate. The pump according to the completed invention will be shaped as referenced in FIG. 4

The gas separation mechanism of the pump according to the present invention is based on the pressure difference between the spaces inside the pump to control the discharge valve to open and close in the case of pumping the liquid containing gas which is described as follows:

When the pump is not operating, this valve is always open due to compression of spring 15.

Under normal operating conditions, the entire liquid without gas enters the pump inlet of cover plate 1, the liquid flows through axial impeller 5 to centrifugal impeller 6. Here, the rotation of motor 21 rotates the impeller cluster causing the entire liquid to rotate. Centrifugal inertial force applied on the fluid will push fluid to the pump outlet to form a continuous flow inside the pump. At rated flow, the pressure at the pump outlet establishes a stable value. This value is greater than the spring compression force 15 causing the valve to remain closed.

There is another flow taking place inside the empty chamber, the rotating fluid will cause unevenly distributed pressure at the liquid areas with different distances from the center of the frame structure 12. For pump in invention, the liquid pressure at the position of the opening is higher than the pressure at the center position, so there is always a flow of liquid flowing from the working liquid chamber through the opening on the baffle 8, moving through the empty chamber and returning to the working liquid chamber. This flow causes the empty space to always be filled with liquid when pumping the liquid without gas.

In the case of a gas containing liquid being drawn into the pump inlet, the gas is minimized by an axial impeller before entering the centrifugal impeller 6 to avoid the case of too large bubbles coming in suddenly and causing the pump to become unstable. Because the pressure distribution at the center of pump chamber is minimal, where small gas accumulate again into a gas-bag. The gas enters the empty space in place of the original liquid. The more the gas in the liquid accumulates the gas-bag until it is time for the volume of working liquid in the pump chamber to drop, resulting in a drop in pressure at the bleed hole 22 of the pump outlet. This opens the spring valve of gas separator. The gas in the empty space run through the gas exhaust port outward, then the gas from the gas-bag will enter the empty chamber according to the position behind the centrifugal impeller.

The liquid flow through the opening in this process plays the role of filling the gas with the liquid that is drawn into the pump, drawing gas into the empty chamber.

This process takes place continuously to separate gas from liquid.

Impact of the Invention

The invention that provides a solution to separate gas from liquid which is currently not available in commercial products. Because of simple structure, the built-in gas separation mechanism on the pump helps to reduce the size and production costs compared to similar role products.

Currently the invention has been successfully tested and applied on fuel systems for jet engines. The invention is also suitable for general fuel systems as well as for systems requiring separation of gases mixed in input fluids such as pulp pumps, chemical pumps.

The invention claimed is:

1. A pump separating gas from liquid comprising:
   a pump housing defining a space area containing a working fluid, circulating a flow of liquid from a pump inlet on a cover plate to a pump outlet on a frame structure;
   a motor and driving mechanism comprising an electric motor fixed on the frame structure so that a drive shaft must satisfy concentricity with an inner circumference of the frame structure;
   an impeller cluster consists of an axial impeller in the shape of two or more spiral blades and a centrifugal impeller in the shape of plural vanes extending from a center to an outside, the axial and centrifugal impellers are mounted in succession on the drive shaft and fixed by bolts and an anti-turn, and the axial impeller are located downsteam the pump inlet;
   a sealing assembly includes an oil seal, an oil seal plate and a first O-ring, all of which are fixed to the frame structure by a baffle and bolts, wherein the baffle divides the pump housing into an empty chamber and a working fluid chamber; on the baffle there is an opening that creates a flow of liquid and gas into the empty chamber;
   a gas separator including a valve seat, a spring and a valve body, all of which are fixed to the frame structure by a gas separator cap and bolts sealed by a second O-ring; the gas separator has a gas discharge duct connected to the empty chamber to draw the gas outside the pump and a bleed hole connected to the pump outlet.

2. The pump separating gas from liquid according to claim 1 wherein the motor and driving mechanism is replaced by an internal combustion engine.

3. The pump separating gas from liquid according to claim 1, wherein the gas separator operates in an open state and a closed state:
   in the open state, the spring will compress and cause the valve seat to move along the valve body into an open position and create a flow from the empty chamber to a gas exhaust port on the gas separator cap;
   in the closed state, when force is applied to the valve seat, the spring is further compressed until it is strong enough to push the valve seat into a closed position.

4. The pump separating gas from liquid according to claim 1, wherein a position of the opening on the baffle of the seal assembly is located between a center and an inward edge of the frame structure in an opposite direction to gravity.

5. The pump separating gas from liquid according to claim 2, wherein the gas separator operates in an open state and a closed state:
   in the open state, the spring will compress and cause the valve seat to move along the valve body into an open position and create a flow from the empty chamber to a gas exhaust port on the gas separator cap;
   in the closed state, when force is applied to the valve seat, the spring is further compressed until it is strong enough to push the valve seat into a closed position.

6. The pump separating gas from liquid according to claim 1 wherein the motor and driving mechanism is replaced by a pneumatic engine.

7. The pump separating gas from liquid according to claim 2, wherein a position of the opening on the baffle of the seal assembly is located between a center and an inward edge of the frame structure in an opposite direction to gravity.

8. The pump separating gas from liquid according to claim 3, wherein a position of the opening on the baffle of the seal assembly is located between the center and an inward edge of the frame structure in an opposite direction to gravity.

9. The pump separating gas from liquid according to claim 1 wherein the motor and driving mechanism comprise an electric motor.

\* \* \* \* \*